(12) United States Patent
Kloc et al.

(10) Patent No.: US 11,962,958 B2
(45) Date of Patent: *Apr. 16, 2024

(54) SYSTEM AND COMPUTER-IMPLEMENTED METHOD FOR PROVIDING RESPONDER INFORMATION

(71) Applicant: 3M INNOVATIVE PROPERTIES COMPANY, St. Paul, MN (US)

(72) Inventors: Longin J. Kloc, Charlotte, NC (US); John R. Wasco, Arden, NC (US); Dana C. DeMeo, Matthews, NC (US); Mark Penna, Charlotte, NC (US); Eric C. Lobner, Woodbury, MN (US); Matthew D. Moore, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,213

(22) Filed: Mar. 14, 2023

(65) Prior Publication Data

US 2023/0217141 A1 Jul. 6, 2023

Related U.S. Application Data

(63) Continuation of application No. 18/075,688, filed on Dec. 6, 2022.

(Continued)

(51) Int. Cl.
*H04Q 9/00* (2006.01)
*G06Q 30/018* (2023.01)
*G06Q 50/26* (2012.01)

(52) U.S. Cl.
CPC ............ *H04Q 9/00* (2013.01); *G06Q 30/018* (2013.01); *G06Q 50/265* (2013.01); *H04Q 2209/10* (2013.01); *H04Q 2209/40* (2013.01)

(58) Field of Classification Search
CPC .. H04Q 9/00; H04Q 2209/00; H04Q 2209/10; H04Q 2209/40; H04Q 2209/43;
(Continued)

(56) References Cited

U.S. PATENT DOCUMENTS 7,949,877 B2 * 5/2011 Hug ........................ G06F 21/10
713/176
8,451,120 B2 5/2013 Johnson, Jr. et al.
(Continued)

FOREIGN PATENT DOCUMENTS

WO 2020075043 A1 4/2020
WO 2020208461 10/2020
WO 2021044150 A1 3/2021

OTHER PUBLICATIONS

Homeland Security, "Computer Aided Dispatch Systems—TechNote", Sep. 2011, System Assessment and Validation for Emergency Responders, pp. 1-2.
(Continued)

*Primary Examiner* — Franklin D Balseca
(74) *Attorney, Agent, or Firm* — Johannes P. M. Kusters; David B. Patchett

(57) ABSTRACT

A system and a computer-implemented method for providing responder information are disclosed herein. The method includes receiving, via a computing device, a sensor data generated by one or more safety devices corresponding to one or more responders. The computer-implemented method further includes analyzing, via the computing device, the sensor data to generate an analyzed sensor data. The computer-implemented method further includes establishing, via an application programming interface (API), a direct communication link between the computing device and at least one server or establishing, via a local application, a direct communication link between the computing device and at least one third party server. The computer-implemented
(Continued)

method further includes transmitting, via the computing device, the analyzed sensor data to the at least one server or transmitting, via the computing device, the analyzed sensor data to the at least one third party server.

8 Claims, 6 Drawing Sheets

Related U.S. Application Data

(60) Provisional application No. 63/265,503, filed on Dec. 16, 2021.

(58) Field of Classification Search
CPC ........... H04Q 2209/50; H04Q 2209/82; H04Q 2209/823; H04Q 2209/84; H04Q 2209/826; G06Q 50/26; G06Q 50/265; G06Q 30/018; G08B 21/0469; G08B 21/0453; G08B 21/14; H04W 4/38; H04W 4/60; H04W 4/90; A62B 18/00; A62B 9/006; A62B 17/00; G01N 33/0075; A42B 3/046; A61B 5/0002; A61B 5/0015; A61B 5/6802; A61B 5/6803; A61B 5/6804; A61B 5/6805; A61B 5/6806; A61B 5/6807; A61B 5/681
See application file for complete search history.

(56) References Cited

U.S. PATENT DOCUMENTS

| | | | |
|---|---|---|---|
| 9,336,675 | B2 | 5/2016 | Miller et al. |
| 9,508,248 | B2 | 11/2016 | Nakfour et al. |
| 10,055,971 | B2 * | 8/2018 | M R .................... G08B 21/182 |
| 10,354,350 | B2 | 7/2019 | Nakfour et al. |
| 10,672,259 | B2 | 6/2020 | Huseth et al. |
| 10,701,520 | B2 | 6/2020 | Singh et al. |
| 10,824,301 | B2 | 11/2020 | Frommelt et al. |
| 10,834,482 | B2 | 11/2020 | Speicher et al. |
| 11,023,818 | B2 | 6/2021 | Awiszus et al. |
| 11,115,732 | B2 * | 9/2021 | Lucrecio ................ G08G 1/205 |
| 2010/0168931 | A1 | 7/2010 | Nasle |
| 2015/0019533 | A1 | 1/2015 | Moody et al. |
| 2019/0175961 | A1 | 6/2019 | Awiszus et al. |
| 2021/0084479 | A1 | 3/2021 | Gideon, III |

OTHER PUBLICATIONS

Barro-Torres, et al., "Real-time personal protective equipment monitoring system", Computer Communications 36 (2012), pp. 42-50, Jan. 18, 2012.

Battistoni et al., "An IoT-Based Mobile System for Safety Monitoring of Lone Workers", IoT 2021, 2, pp. 476-497, MDPI, Aug. 3, 2021, 22 pp.

Int'l Search Report for Appl. No. PCT/IB2022/061843, dated Mar. 13, 2023, 6 pp.

* cited by examiner

SYSTEM AND COMPUTER-IMPLEMENTED METHOD FOR PROVIDING RESPONDER INFORMATION

CROSS REFERENCE TO RELATED APPLICATIONS

This application is a continuation of U.S. application Ser. No. 18/075,688, filed Dec. 6, 2022, now allowed, which claims priority from U.S. Provisional Application Ser. No. 63/265,503, filed Dec. 16, 2021, the disclosure of which is incorporated by reference in its/their entirety herein.

TECHNICAL FIELD

The present disclosure relates to a system for providing responder information. The present disclosure further relates to a computer-implemented method for providing the responder information.

BACKGROUND

Various safety devices, such as articles of PPE and safety tools and equipment may be used by responders, such as firefighters or any other emergency responders, in hazardous environments. Telemetry data from the safety devices of the responders in the hazardous environments may be greatly valued by software companies that specialize in providing such telemetry data to other personnel or a central base station as a common operating picture of the hazardous environments. However, such telemetry data may not be available to the software companies as they may not have any access to the telemetry data of the responders and insights about their wellbeing once the responders enter the hazardous environments. Therefore, such software companies may not be able to provide a holistic and complete view of events in the hazardous environments.

SUMMARY

In a first aspect, the present disclosure provides a computer-implemented method for providing responder information. The computer-implemented method includes receiving, via a computing device, a sensor data generated by one or more safety devices corresponding to one or more responders. The computer-implemented method further includes analyzing, via the computing device, the sensor data to generate an analyzed sensor data. The computer-implemented method further includes establishing, via an application programming interface (API), a direct communication link between the computing device and at least one server. The computer-implemented method further includes transmitting, via the computing device, the analyzed sensor data to the at least one server.

In a second aspect, the present disclosure provides a system for providing responder information. The system includes one or more safety devices corresponding to one or more responders. The one or more safety devices are configured to generate a sensor data. The system further includes a computing device communicably coupled to the one or more safety devices via a communication channel. The system further includes at least one server. The system further includes an application programming interface (API) for establishing a direct communication link between the computing device and the at least one server. The computing device is configured to receive the sensor data generated by the one or more safety devices via the communication channel. The computing device is further configured to analyze the sensor data to generate an analyzed sensor data. The computing device is further configured to transmit the analyzed sensor data to the at least one server.

In a third aspect, the present disclosure provides a system for providing responder information. The system includes one or more safety devices corresponding to one or more responders. The one or more safety devices are configured to generate a sensor data. The system further includes one or more handheld computing devices communicably coupled to the one or more safety devices via corresponding first communication channels. The system further includes a computing device communicably coupled to the one or more safety devices via a second communication channel. The system further includes a third party system. The third party system includes at least one third party server communicably coupled to the computing device and one or more display devices communicably coupled to the at least one third party server. The computing device includes a local application for establishing corresponding direct communication links between the computing device and the one or more handheld computing devices and for establishing a direct communication link between the computing device and the at least one third party server. Each of the computing device and the one or more handheld computing devices is configured to receive the sensor data generated by the one or more safety devices via the first or second communication channels and analyze the sensor data to generate an analyzed sensor data. The one or more handheld computing devices are further configured to transmit the analyzed sensor data to the computing device via the corresponding direct communication links. The computing device is configured to transmit the analyzed sensor data to the at least one third party server via the local application. The at least one third party server is configured to determine a responder information based on the analyzed sensor data. The at least one third party server is further configured to transmit the responder information to the one or more display devices. The one or more display devices are configured to display the responder information.

In a fourth aspect, the present disclosure provides a system for providing responder information. The system includes one or more safety devices corresponding to one or more responders. The one or more safety devices are configured to generate a sensor data. The system further includes one or more handheld computing devices communicably coupled to the one or more safety devices via corresponding first communication channels. The system further includes a computing device communicably coupled to the one or more safety devices via a second communication channel. The system further includes a third party system. The third party system includes at least one third party server communicably coupled to the computing device and one or more display devices communicably coupled to the at least one third party server. The computing device includes a local application for establishing a direct communication link between the computing device and the at least one third party server. The one or more handheld computing devices include corresponding application programming interfaces (API) for establishing corresponding direct communication links between the one or more handheld computing devices and the at least one third party server. Each of the computing device and the one or more handheld computing devices is configured to receive the sensor data generated by the one or more safety devices via the first or second communication channels. Each of the computing device and the one or more handheld computing devices is further configured to analyze the sensor data to generate an analyzed sensor data. The one or more handheld computing devices are further configured to transmit the analyzed sensor data to the at least one third party server via the corresponding direct communication links. The computing device is configured to transmit the analyzed sensor data to the at least one third party server via the local application. The at least one third party server is configured to determine a responder information based on the analyzed sensor data. The at least one third party server is further configured to transmit the responder information to the one or more display devices. The one or more display devices are configured to display the responder information.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
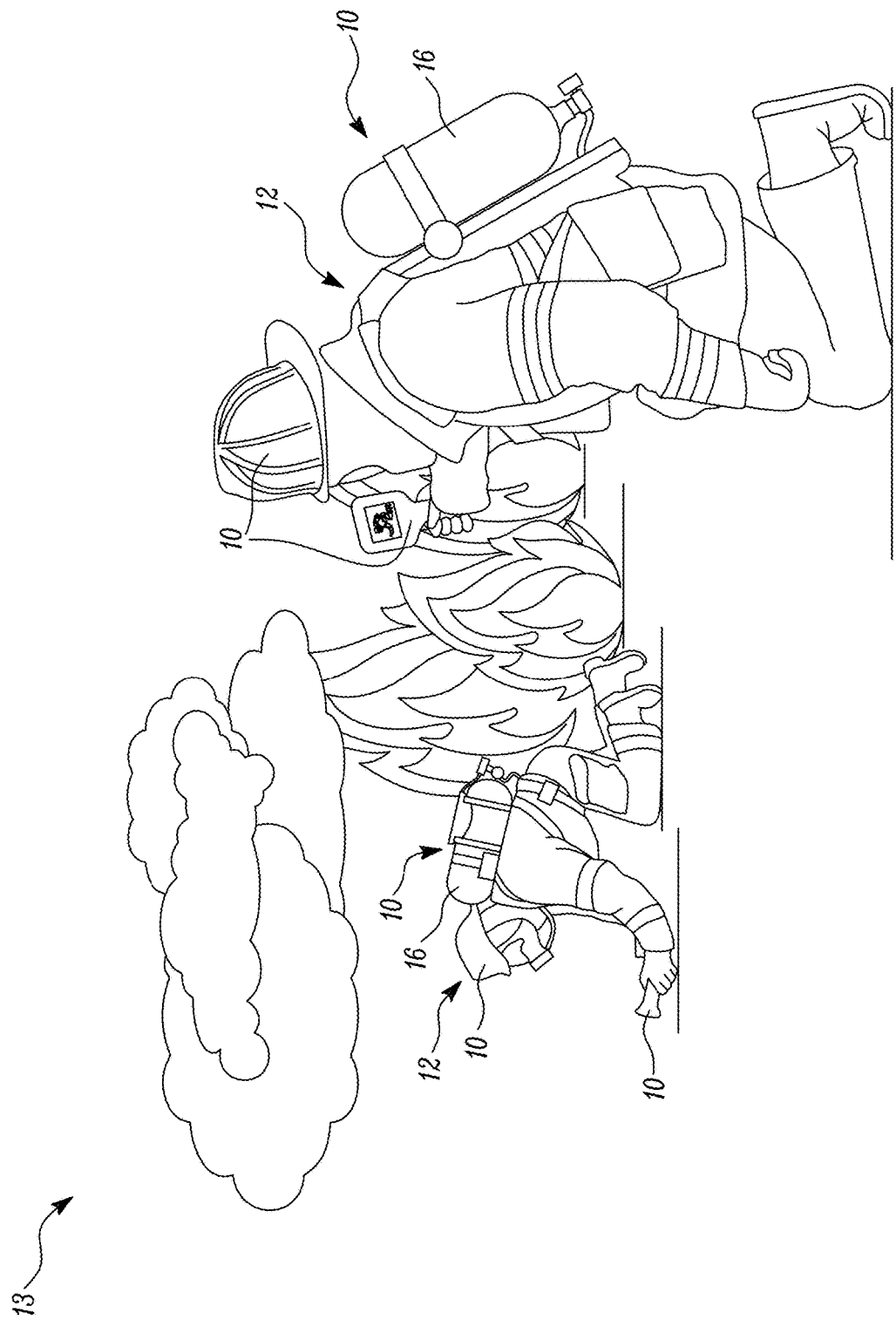
FIG. 1 illustrates a schematic representation of one or more safety devices being worn by one or more responders in a hazardous environment.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the term "hazardous or potentially hazardous environmental conditions" may refer to environmental conditions that may be harmful to a human being, such as high noise levels, high ambient temperatures, lack of oxygen, presence of explosives, exposure to radioactive or biologically harmful materials, and exposure to other hazardous substances. Depending upon the type of safety equipment, environmental conditions and physiological conditions, corresponding thresholds or levels may be established to help define hazardous and potentially hazardous environmental conditions.

As used herein, the term "hazardous or potentially hazardous environments" may refer to environments that include hazardous or potentially hazardous environmental conditions. The hazardous or potentially hazardous environments may include, for example, fires, chemical environments, biological environments, nuclear environments, industrial sites, construction sites, agricultural sites, mining sites, or manufacturing sites.

As used herein, the term "an article of personal protective equipment (PPE)" may include any type of equipment or clothing that may be used to protect a user from hazardous or potentially hazardous environmental conditions. In some examples, one or more individuals, such as the users, may utilize the article of PPE while engaging in tasks or activities within the hazardous or potentially hazardous environment. Examples of the articles of PPE may include, but are not limited to, hearing protection (including ear plugs and ear muffs), respiratory protection equipment (including disposable respirators, reusable respirators, powered air purifying respirators, self-contained breathing apparatus and supplied air respirators), facemasks, oxygen tanks, air bottles, protective eyewear, such as visors, goggles, filters or shields (any of which may include augmented reality functionality), protective headwear, such as hard hats, hoods or helmets, protective shoes, protective gloves, other protective clothing, such as coveralls, aprons, coat, vest, suits, boots and/or gloves, protective articles, such as sensors, safety tools, detectors, global positioning devices, mining cap lamps, fall protection harnesses, exoskeletons, self-retracting lifelines, heating and cooling systems, gas detectors, and any other suitable gear configured to protect the users from injury. The articles of PPE may also include any other type of clothing or device/equipment that may be worn or used by the users to protect against extreme noise levels, extreme temperatures, fire, reduced oxygen levels, explosions, reduced atmospheric pressure, radioactive, and/or biologically harmful materials.

As used herein, the term "communicably coupled to" refers to direct coupling between components and/or indirect coupling between components via one or more intervening components. Such components and intervening components may comprise, but are not limited to, junctions, communication paths, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner than can be recognized by the second component.

As used herein, the term "network" may be associated with transmission of messages, packets, signals, and/or other forms of information between and/or within one or more network devices. In some examples, the network may include one or more wired and/or wireless networks operated in accordance with any communication standard that is or becomes known or practicable.

As used herein, the term "communication channel" may refer to a path, a conduit, a logical channel, or any means of communication that enables or supports a communication interaction or an exchange of information between two or more devices or parties. The communication channel may be wired or wireless.

As used herein, the term "signal," includes, but is not limited to, one or more electrical signals, optical signals, electromagnetic signals, analog and/or digital signals, one or more computer instructions, a bit and/or bit stream, or the like.

As used herein, the term "information request signal" refers to a signal, configured to cause a response from a receiving system, for example, cause the receiving system to transmit data.

As used herein, the term "server" refers to a computer that responds to requests over a network to provide resources, data, services, or programs to other computers, known as clients, over the network.

As used herein, the term "remote server" refers to a computer that is outside a given geographical location and provides resources, data, services, or programs to other computers, known as clients, over a network.

As used herein, the term "third party system," refers to a system that does not have a direct relationship with a user or the device from which the data is being collected. The third party system may receive resources, data, services, or programs from one or more servers and provide it to other computers over a network.

As used herein, the terms "application programming interface" or "API" refers to a set of programming instructions for accessing a web-based software application, a web tool, or a service. The API may be executed by a processor to facilitate interaction between software components such as, for example, an application that communicates data to and/or receives data from a server.

As used herein, the term "local application" is an application that is executed on a processor of an electronic device, which may be in communication with servers via a network.

As used herein, the terms "responder" or "emergency responder" refer to any person or persons responsible for addressing an emergency situation, such as firefighters, first responders, healthcare professionals, paramedics, HAZMAT workers, security personnel, law enforcement personnel, or any other personnel working in the hazardous environment.

As used herein, the term "responder information" includes, but is not limited to, environmental conditions of responders, physiological conditions of the responders, location data of the responders, and working status of one or more safety devices corresponding to the responders.

Generally, third party software companies specialize in providing a common operating picture of responders, such as firefighters, in hazardous environments, such as burning buildings, to a central commander or a central base station. However, such software companies as may not have any insight of the responders and their wellbeing once the responders enter the hazardous environments.

The responders may carry various safety devices, such as articles of PPE and safety tools and equipment in hazardous environments. The safety devices may generate various data indicative of environmental conditions of the responders, physiological conditions the responders, location of the responders, and working status of the one or more safety devices. Such data generated from the safety devices of the responders in the hazardous environments may therefore be greatly valued by the software companies and may be used for providing a more holistic and complete view of events in the hazardous environments.

In an aspect, the present disclosure provides system and a computer-implemented method for providing responder information are disclosed herein. The method includes receiving, via a computing device, a sensor data generated by one or more safety devices corresponding to one or more responders. The computer-implemented method further includes analyzing, via the computing device, the sensor data to generate an analyzed sensor data. The computer-implemented method further includes establishing, via an application programming interface (API), a direct communication link between the computing device and at least one server or establishing, via a local application, a direct communication link between the computing device and at least one third party server. The computer-implemented method further includes transmitting, via the computing device, the analyzed sensor data to the at least one server or transmitting, via the computing device, the analyzed sensor data to the at least one third party server.

Since the system and the computer-implemented method of the present disclosure provides the analyzed sensor data to the at least one server or the analyzed sensor data to the at least one third party server, a third party system may easily access the analyzed sensor data and combine the analyzed sensor data to provide the common operating picture which may be a more holistic and complete view of events happening with the one or more responders at the hazardous environments.

Referring to figures, FIG. 1 illustrates a schematic representation of one or more exemplary safety devices 10 associated with one or more responders 12. In the illustrated embodiment of FIG. 1, the one or more safety devices 10 are shown associated with two responders 12. The one or more safety devices 10 may be worn or used by the one or more responders 12 dispatched in a hazardous environment 13. Therefore, the one or more safety devices 10 may be worn or used by the one or more responders 12 in the hazardous environment 13. In some embodiments, each of the one or more safety devices 10 corresponding to the one or more responders 12 may be different or similar to each other.

In some examples, the one or more responders 12 may be any emergency personnel, such as firefighters, first responders, healthcare professionals, paramedics, HAZMAT workers, security personnel, law enforcement personnel, or any other personnel working in the hazardous environment 13. In the illustrated embodiment of FIG. 1, the one or more responders 12 are firefighters and the one or more safety devices 10 are worn by the firefighters in the hazardous environment 13, i.e., a burning environment or a burning building. In some embodiments, each of the one or more safety devices 10 includes at least one of an article of PPE and an emergency response tool.

In some examples, the article of PPE may further include a thermal imaging camera, heads-up display, one or more communication devices, signaling devices, or audio devices. In some examples, the emergency response tool may include a rapid intervention team (RIT) bag, search and rescue tools, warning devices, such as an alarm device, or other connected tools or equipment.

In the illustrated embodiment of FIG. 1, some of the one or more safety devices 10 include a breathing apparatus. For example, the one or more responders 12 may carry a self-contained breathing apparatus (SCBA) that is worn on the back of the one or more responders 12 and includes an air supply tank 16. In some other embodiments, the one or more safety devices 10 may include respiratory protective equipment (RPS), powered air purifying respirator (PAPR), non-powered purifying respirator (APR), self-retracting lifeline (SRL), or combinations thereof.

Figure 2:
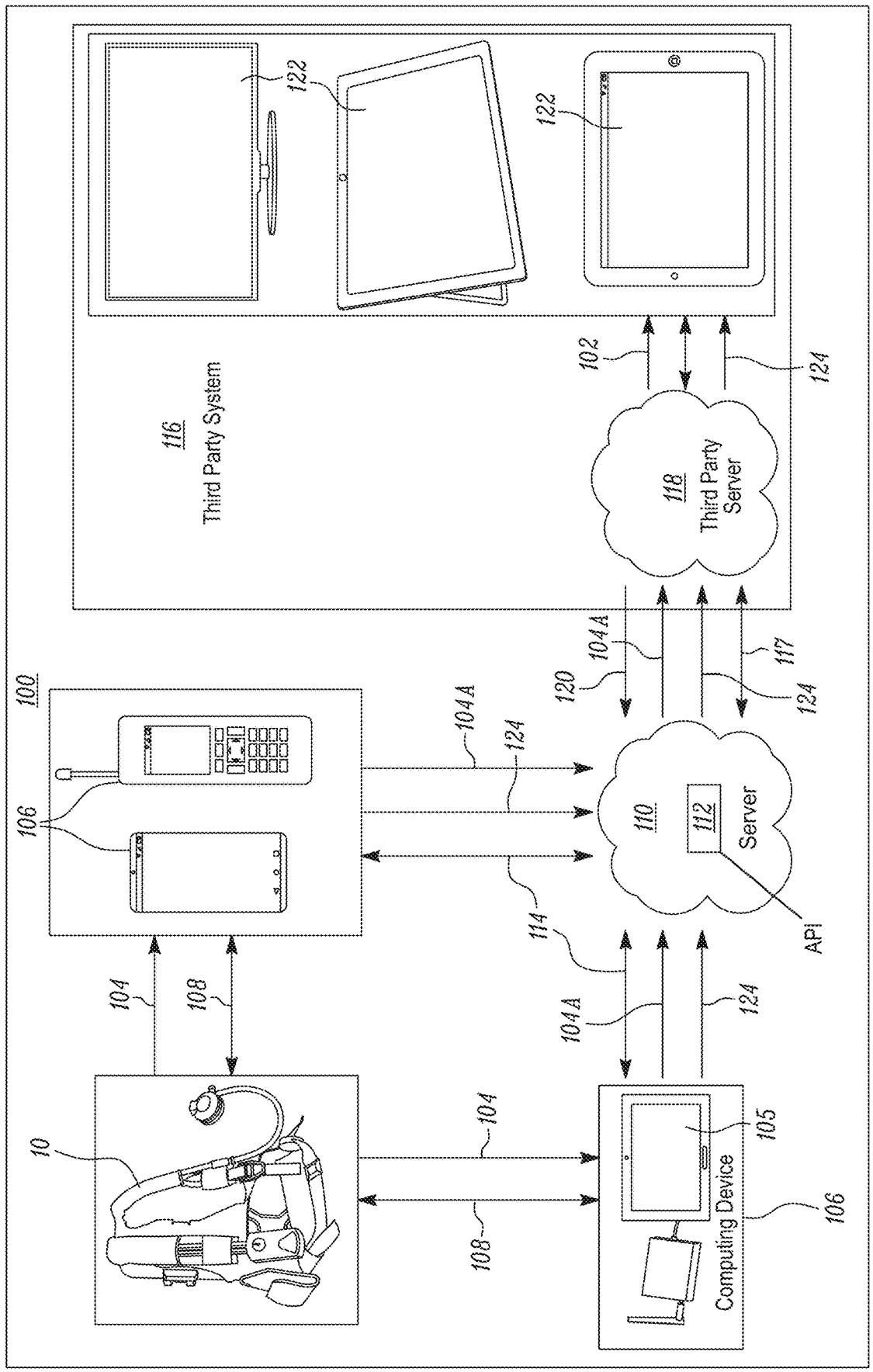
FIG. 2 illustrates a detailed schematic representation of a system for providing responder information, according to an embodiment of the present disclosure.

FIG. 2 illustrates a detailed schematic representation of a system 100 for providing responder information 102, according to an embodiment of the present disclosure.

The system 100 includes the one or more safety devices 10 corresponding to the one or more responders 12 (shown in FIG. 1). The one or more safety devices 10 are configured to generate a sensor data 104. Specifically, one or more sensors (not shown) disposed in the one or more safety devices 10 may be configured to generate the sensor data 104. Each of the one or more safety devices 10 of the corresponding responder 12 from the one or more responders 12 may generate a data. The data generated by each of the one or more safety devices 10 may be collectively referred to as the sensor data 104. The sensor data 104 may be associated with the one or more safety devices 10 and/or the one or more responders 12.

In some embodiments, the sensor data 104 generated by the one or more safety devices 10 is indicative of at least one of environmental conditions of the corresponding one or more responders 12, physiological conditions of the corresponding one or more responders 12, location data of the corresponding one or more responders 12, and one or more parameters of the one or more safety devices 10.

In some embodiments, the environmental conditions of the corresponding one or more responders 12 may include surrounding pressure, surrounding temperature, presence of any hazardous smoke or gas, contamination or any other environmental conditions affecting the one or more responders 12 in the hazardous environment 13 (shown in FIG. 1).

In some embodiments, the physiological conditions of the corresponding one or more responders 12 may include heart rate, respiratory rate, blood pressure, body temperature, blood oxygen level, chemical composition in blood, or any other physiological condition of the one or more responders 12.

In some embodiments, the location data of the corresponding one or more responders 12 may include Global Positioning System (GPS) data such as GPS coordinates, position of the corresponding one or more responders 12 in the hazardous environment 13, movement (e.g., speed, direction) of the corresponding one or more responders 12 in the hazardous environment 13, and so forth.

In some embodiments, the one or more parameters of the one or more safety devices 10 may include a state of charge of a battery of the one or more safety devices 10, remaining air percentage in an air tank of the one or more safety devices 10, life of a filter used in the one or more safety devices 10, temperature of the one or more safety devices 10, fit of the one or more safety devices 10, connection between one or more components of the one or more safety devices 10, or any other parameters of the one or more safety devices 10 that may affect credibility of the one or more safety devices 10.

The system 100 further includes a computing device 106 communicably coupled to the one or more safety devices 10 via a communication channel 108. In some embodiments, the system 100 includes more than one computing devices 106. In some embodiments, the computing device 106 may not be a portable device, for example, the computing device 106 may be a desktop computer, workstation, etc. However, in some other embodiments, the computing device 106 is a portable device, for example, a smartphone, a handheld transceiver, and the like. In some other embodiments, the system 100 may include both portable and non-portable computing devices.

In some embodiments, the communication channel 108 is a Radio communication channel. The Radio communication channel may include at least one of a Bluetooth communication channel, a Wi-Fi communication channel, a Long Term Evolution (LTE) communication channel, and a Zigbee communication channel. In some embodiments, the communication channel 108 may include at least one of a long range (LoRa) network communication channel, a Bluetooth low energy (BLE) communication channel, a WiMAX communication channel, a cellular communication channel, a wide area network (WAN) communication channel, a Narrow Band-Internet of Things (NB-IoT) communication channel, a Digital enhanced cordless telecommunications (DECT) communication channel, a Wi-Fi direct communication channel, a Voice over Long Term Evolution (VoLTE) communication channel, a Land Mobile Radio (LMR) communication channel, an ultra-wideband (UWB) communication channel, and a custom communication channel. In some embodiments, the communication channels may include a wired communication channel. In some embodiments, the communication channel 108 may include any other communication channel based on the desired application attributes.

The system 100 further includes at least one server 110 and an application programming interface (API) 112 for establishing a direct communication link 114 between the computing device 106 and the at least one server 110.

In some embodiments, the at least one server 110 may be a remote server. In some other embodiments, the at least one server 110 may be located remotely or located within the computing device 106 executing as a separate process.

In the illustrated embodiment of FIG. 1, the API 112 is integrated in the server 110. However, in some other embodiments, the computing device 106 may include the API 112.

Further, the computing device 106 may be configured to receive the sensor data 104 generated by the one or more safety devices 10 via the communication channel 108. The computing device 106 is further configured to analyze the sensor data 104 to generate an analyzed sensor data 104A. In some embodiments, the computing device 106 may include one or more processing units or processors (not shown) for the analysis of the sensor data 104 and generation of the analyzed sensor data 104A. The computing device 106 is further configured to transmit the analyzed sensor data 104A to the at least one server 110.

In some embodiments, the computing device 106 is further configured to generate an alert 124 when a value of the sensor data 104 crosses a corresponding threshold and transmit the alert 124 to the at least one server 110. In some embodiments, the computing device 106 may include a display 105 for displaying the alert 124. In some embodiments, the display 105 may further be configured to display the sensor data 104. In some embodiments, the sensor data 104 may be displayed in a basic form. For example, the display 105 may be configured to display individual sensor data from the one or more safety devices 10 and their corresponding values. In some embodiments, the computing device 106 is further configured to transmit the alert 124 to the at least one server 110.

In some embodiments, the system 100 further includes a third party system 116. The third party system 116 includes at least one third party server 118 communicably coupled to the at least one server 110. In some embodiments, the at least one third party server 118 is communicably coupled to the at least one server 110 via a communication link 117. The at least one server 110 is configured to transmit the analyzed sensor data 104A to the at least one third party server 118.

In some embodiments, the at least one third party server 118 is configured to transmit an information request signal 120 to the at least one server 110. The at least one server 110 is configured to transmit the analyzed sensor data 104A to the at least one third party server 118 upon receiving the information request signal 120 from the at least one third party server 118.

In some embodiments, the third party system 116 further includes one or more display devices 122 communicably coupled to the at least one third party server 118. The at least one third party server 118 is configured to determine the responder information 102 based on the analyzed sensor data 104A and transmit the responder information 102 to the one or more display devices 122. The one or more display devices 122 are configured to display the responder information 102. In some embodiments, the responder information 102 may be represented/displayed on the one or more display devices 122 in a basic form, a pictorial form, or a graphical form. In some embodiments, the responder information 102 may be represented in a form of a common operation picture, that is, a single identical display of relevant information (for example, positions and statuses of the one or more responders 12 in the hazardous environment 13).

In some embodiments, the at least one server 110 is further configured to transmit the alert 124 to the at least one third party server 118. The at least one third party server 118 is further configured to transmit the alert 124 to the one or more display devices 122. The one or more display devices 122 are configured to display the alert 124 upon receiving the alert 124 from the at least one third party server 118.

In some embodiments, the alert 124 may further include, but not limited to, an audible notification, a visual notification, a haptic notification, an alarm, and a pop-up on displays of the one or more display devices 122.

In some embodiments, the one or more display devices 122 are portable devices, for example, a tablet, a laptop, a smartphone, and the like. However, in some other embodiments, the one or more display devices 122 may not be portable devices.

In some embodiments, the at least one server 110 is further configured to charge responder information fees based on at least one of a number of the information request signals 120 in a predetermined period of time, a number of the one or more safety devices 10 in the information request signal 120, types of the one or more safety devices 10 in the information request signal 120, a total number of the one or more display devices 122 of the third party system 116, an amount of the analyzed sensor data 104A transmitted to the at least one third party server 118 in a predetermined period of time, and an access fee for accessing the analyzed sensor data 104A.

The at least one server 110 may, for example, charge the access fees based on the amount of the analyzed sensor data 104A accessed by the at least one third party server 118. In some examples, the at least one server 110 may charge subscription service fees or time-based fees based on usage (e.g., 100 Mega Byte). In some examples, the third party server 118 may be configured to access the at least one server 110 ten times in a month, or the third party server 118 may be configured to transmit the responder information 102 to only four of the display devices 122 of the third party system 116. In some cases, the at least one server 110 may charge a greater value of the responder information fees if the third party server 118 requests the analyzed sensor data 104A generated from a greater number of the one or more safety devices 10 and a lesser value of the responder information fees if the third party server 118 requests the analyzed sensor data 104A generated from a lesser number of the one or more safety devices 10. In some embodiments, the responder information fees may be a fixed amount for a fixed interval of time, for example, a fixed amount for a month.

In some embodiments, a local computer (not shown) may store data related to the responder information fees and forward the stored data to the at least one server 110 when the communication link 117 between the at least one server 110 and the third party server 118 is re-established.

Figure 3:
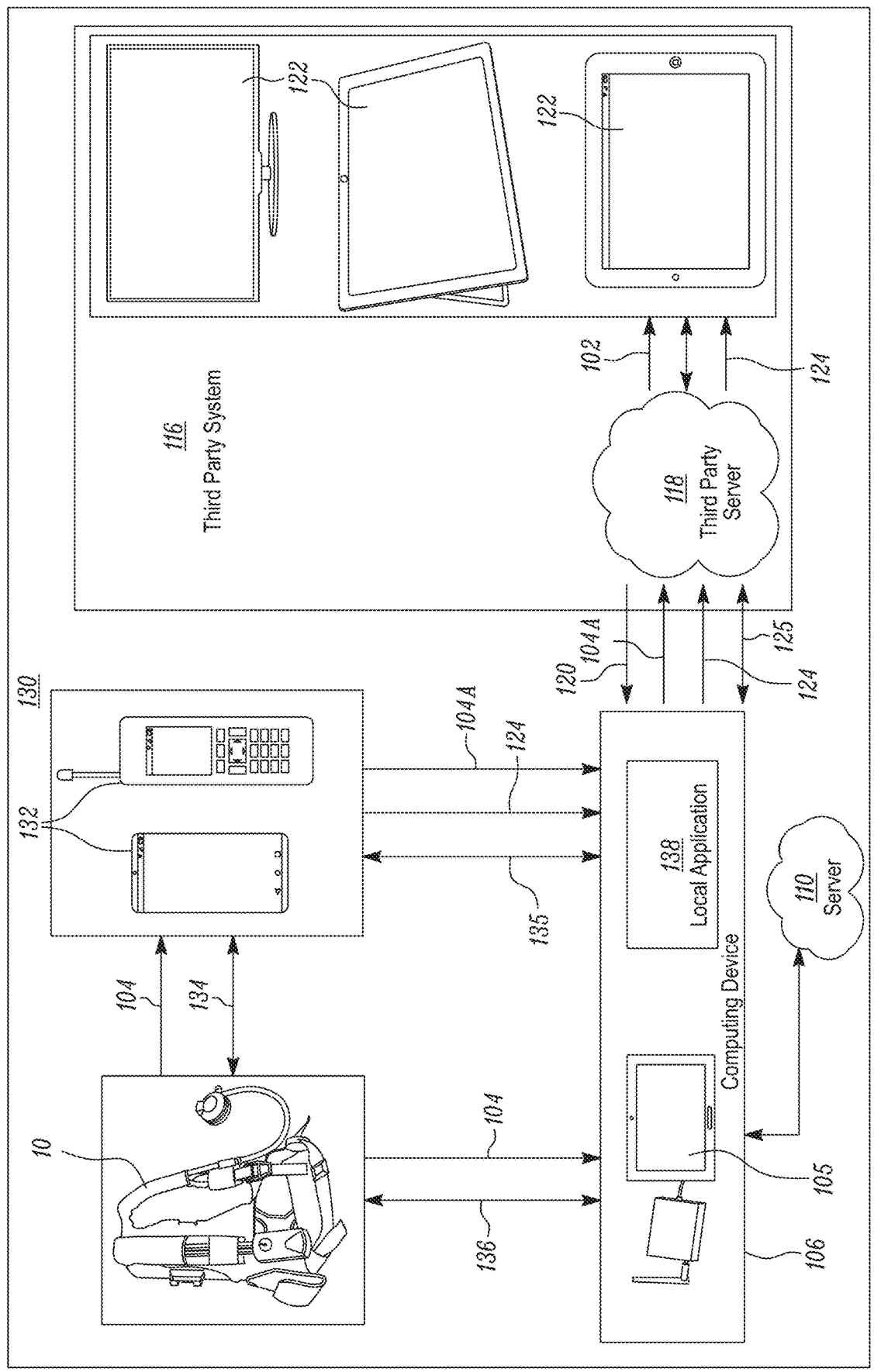
FIG. 3 illustrates a detailed schematic representation of a system for providing responder information, according to another embodiment of the present disclosure.

FIG. 3 illustrates a detailed schematic representation of a system 130 for providing the responder information 102, according to another embodiment of the present disclosure.

The system 130 is substantially similar to the system 100 of FIG. 2 with common components being referred to by the same reference numerals. However, the system 130 has a different configuration. In the illustrated embodiment of FIG. 3, the at least one third party server 118 is communicably coupled to the computing device 106.

The system 130 includes one or more handheld computing devices 132 communicably coupled to the one or more safety devices 10 via corresponding first communication channels 134. In some embodiments, the one or more handheld computing devices 132 may be portable devices. The one or more handheld computing devices 132 may include smartphones, handheld transceivers, or any other portable computing devices.

The system 130 further includes the computing device 106 communicably coupled to the one or more safety devices 10 via a second communication channel 136.

In some embodiments, the first and second communication channels 134, 136 may be substantially similar to the communication channels 108 (shown in FIG. 2). In some embodiments, the first communication channel 134 may be different from the second communication channel 136.

The computing device 106 further includes a local application 138 for establishing corresponding direct communication links 135 between the computing device 106 and the one or more handheld computing devices 132.

In some other embodiments, the computing device 106 may include an API (e.g., the API 112) for establishing the corresponding direct communication links 135 between the computing device 106 and the one or more handheld computing devices 132.

Each of the computing device 106 and the one or more handheld computing devices 132 is configured to receive the sensor data 104 generated by the one or more safety devices 10 via the first or second communication channels 134, 136. Specifically, the one or more handheld computing devices 132 are configured to receive the sensor data 104 generated by the one or more safety devices 10 via the corresponding first communication channels 134 and the computing device 106 is configured to receive the sensor data 104 generated by the one or more safety devices 10 via the second communication channel 136.

In some embodiments, the sensor data 104 generated by some of the safety devices 10 from the one or more safety devices 10 may be transmitted to the one or more handheld computing devices 132 via the corresponding first communication channels 134 and the sensor data 104 generated by some of the safety devices 10 from the one or more safety devices 10 may be transmitted to the computing device 106 via the second communication channel 136.

Each of the computing device 106 and the one or more handheld computing devices 132 is further configured to analyze the sensor data 104 to generate the analyzed sensor data 104A. The one or more handheld computing devices 132 are further configured to transmit the analyzed sensor data 104A to the computing device 106 via the corresponding direct communication links 135.

In some embodiments, the one or more handheld computing devices 132 may also be configured to generate the alert 124 and transmit the the alert 124 to the computing device 106 via the corresponding direct communication links 135.

In this embodiment, the system 130 may optionally include the at least one server 110 communicably coupled to the computing device 106. Further, the computing device 106 is configured to transmit the analyzed sensor data 104A to the at least one server 110.

In some embodiments, the analyzed sensor data 104A from the computing device 106 and the analyzed sensor data 104A from the one or more handheld computing devices 132 may be merged by the computing device 106.

Further, the computing device 106 is configured to transmit the analyzed sensor data 104A to the at least one third party server 118 via the local application 138. In some embodiments, the local application 138 may be used for establishing a direct communication link 125 between the computing device 106 and the at least one third party server 118.

In some embodiments, the at least one third party server 118 is configured to transmit the information request signal 120 to the computing device 106. The computing device 106 is configured to transmit the analyzed sensor data 104A to the at least one third party server 118 upon receiving the information request signal 120 from the at least one third party server 118.

In some embodiments, the computing device 106 is further configured to transmit the alert 124 to the at least one third party server 118.

Figure 4:
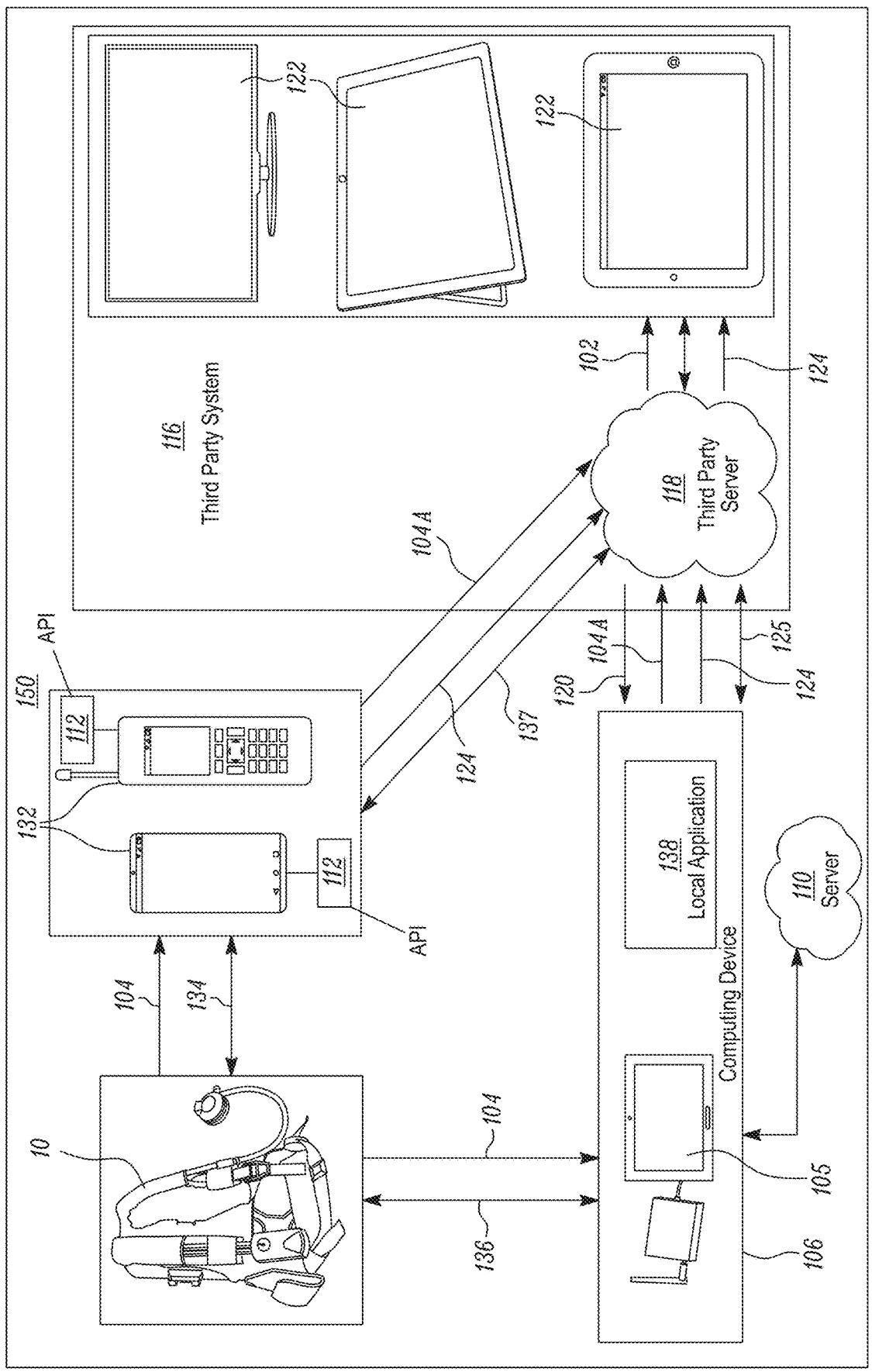
FIG. 4 illustrates a detailed schematic representation of a system for providing responder information, according to another embodiment of the present disclosure.

FIG. 4 illustrates a detailed schematic representation of a system 150 for providing the responder information 102, according to another embodiment of the present disclosure.

The system 150 is substantially similar to the system 130 of FIG. 3 with common components being referred to by the same reference numerals. However, the system 150 has a different configuration. In the illustrated embodiment of FIG. 4, the one or more handheld computing devices 132 include corresponding APIs 112 for establishing corresponding direct communication links 137 between the one or more handheld computing devices 132 and the at least one third party server 118.

In some embodiments, the one or more handheld computing devices 132 are further configured to transmit the analyzed sensor data 104 to the at least one third party server 118 via the corresponding direct communication links 137. Therefore, the one or more handheld computing devices 132 may transmit the analyzed sensor data 104A directly to the at least one third party server 118 via the corresponding direct communication links 137. Specifically, the one or more handheld computing devices 132 may not require to transmit the analyzed sensor data 104A to the computing device 106 in order to transmit the analyzed sensor data 104A to the at least one third party server 118.

In some embodiments, the at least one third party server 118 may be configured to transmit the information request signal 120 to the computing device 106 and the one or more handheld computing devices 132. The computing device 106 and the one or more handheld computing devices 132 are configured to transmit the analyzed sensor data 104A to the at least one third party server 118 upon receiving the information request signal 120 from the at least one third party server 118.

In some embodiments, the one or more handheld computing devices 132 may further be configured to generate the alert 124 and further configured to transmit the alert 124 to the at least one third party server 118.

Figure 5:
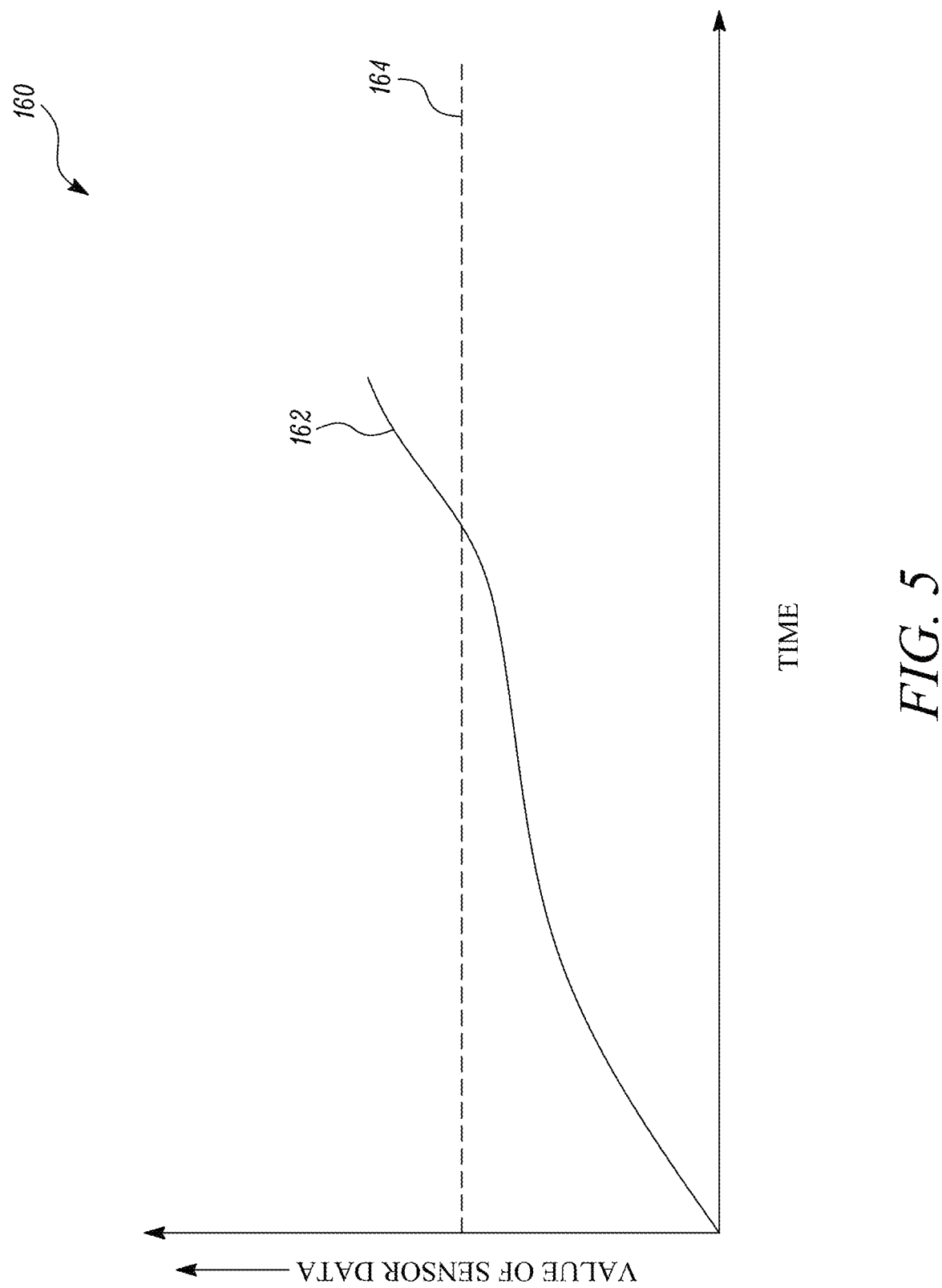
FIG. 5 illustrates an exemplary graph representing a sensor data generated by the one or more safety devices.

FIG. 5 illustrates an exemplary graph 160 representing a variation of a value of the sensor data 104 (shown in FIGS. 2-4) with respect to time. The graph 160 includes a curve 162 representative of the sensor data 104 with respect to time. The graph 160 further includes a threshold curve 164 (shown by a dashed line) representative of a threshold for the sensor data 104.

Referring to FIGS. 2-5, as discussed above, the computing device 106 is configured to generate the alert 124 when a value of the sensor data 104 crosses the threshold and transmit the alert 124 to the at least one server 110. Specifically, the computing device 106 is further configured to generate the alert 124 when the curve 162 crosses the threshold curve 164 and transmit the alert 124 to the at least one server 110. In some embodiments, the at least one server 110 is configured to transmit the alert 124 to the at least one third party server 118.

In some embodiments, the computing device 106 is configured to generate the alert 124 and transmit the alert 124 to the at least one third party server 118. In some embodiments, the one or more handheld computing devices 132 are configured to generate the alert 124 and transmit the alert 124 to the at least one third party server 118.

In some embodiments, the sensor data 104 may include multiple data, e.g., pressure data, temperature data. In such cases, the various sensor data 104 may have corresponding thresholds, e.g., pressure threshold, temperature threshold. The computing device 106 is configured to generate the alert 124 when a value of the sensor data 104 crosses the corresponding threshold.

The at least one third party server 118 is configured to transmit the alert 124 to the one or more display devices 122. The one or more display devices 122 are configured to display the alert 124 upon receiving the alert 124 from the at least one third party server 118. In some embodiments, the alert 124 may also be displayed by the display 105 of the computing device 106.

In some embodiments, the alert 124 may include, but not limited to, an audible notification, a visual notification, a haptic notification, an alarm, and a pop-up on the display of the one or more display devices 122 or the display 105.

Figure 6:
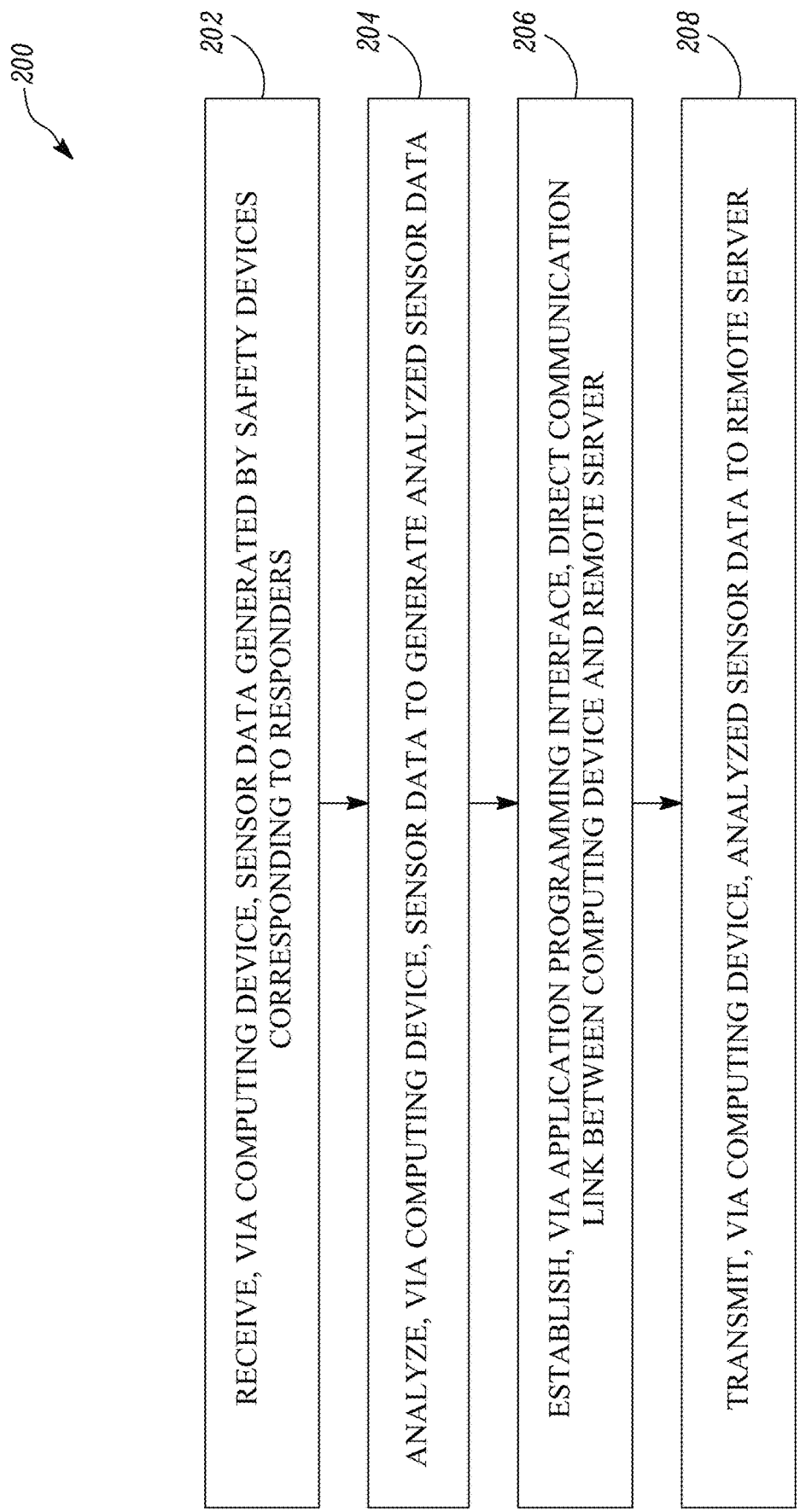
FIG. 6 illustrates a flowchart depicting a computer-implemented method for providing the responder information, according to an embodiment of the present disclosure.

FIG. 6 illustrates a flowchart depicting a computer-implemented method 200 (hereinafter, "the method 200") for providing the responder information 102, according to an embodiment of the present disclosure. In some embodiments, the method 200 may be implemented in the system 100 of FIG. 2. The method 200 is described with reference to FIG. 2.

At step 202, the method 200 includes receiving, via the computing device 106, the sensor data 104 generated by the one or more safety devices 10 corresponding to the one or more responders 12.

At step 204, the method 200 further includes analyzing, via the computing device 106, the sensor data 104 to generate the analyzed sensor data 104A.

At step 206, the method 200 further includes establishing, via the API 112, the direct communication link 114 between the computing device 106 and the at least one server 110.

At step 208, the method 200 further includes transmitting, via the computing device 106, the analyzed sensor data 104A to the at least one server 110.

In some embodiments, the method 200 further includes receiving, via the at least one server 110, the information request signal 120 from the at least one third party server 118 of the third party system 116.

In some embodiments, the method 200 further includes transmitting, via the at least one server 110, the analyzed sensor data 104A to the at least one third party server 118 upon receiving the information request signal 120 from the at least one third party server 118 of the third party system 116.

The method 200 further includes determining, via the at least one third party server 118, the responder information 102 based on the analyzed sensor data 104A.

The method 200 further includes transmitting, via the at least one third party server 118, the responder information 102 to the one or more display devices 122 of the third party system 116.

The method 200 further includes displaying, via the one or more display devices 122, the responder information 102.

In some embodiments, the method 200 further includes transmitting, via the at least one server 110, the analyzed sensor data 104A to the at least one third party server 118 of the third party system 116 without receiving the information request signal 120 from the at least one third party server 118 of the third party system 116.

In some embodiments, the method 200 further includes generating, via the computing device 106, the alert 124 when a value of the sensor data 104 crosses the corresponding threshold. The method 200 further includes transmitting, via the computing device 106, the alert 124 to the at least one server 110.

In some embodiments, the method 200 further includes transmitting, via the at least one server 110, the alert 124 to the at least one third party server 118 of the third party system 116. The method 200 further includes transmitting, via the third party system 116, the alert 124 to the one or more display devices 122. The method 200 further includes displaying, via the one or more display devices 122, the alert 124 upon receiving the alert 124 from the at least one third party server 118.

In some embodiments, the method 200 further includes charging, via the at least one server 110, responder information fees based on at least one of the number of the information request signals 120 in the predetermined period of time, the number of the one or more safety devices 10 in the information request signal 120, types of the one or more safety devices 10 in the information request signal 120, the total number of the one or more display devices 122 of the third party system 116, the amount of the analyzed sensor data 104A transmitted to the at least one third party server 118 in the predetermined period of time, and the access fee for accessing the analyzed sensor data 104A.

Advantageously, the systems 100, 130, 150, and the method 200 and may allow selective transmission of the sensor data 104 and/or the analyzed sensor data 104A to the third party system 116. Specifically, in some cases, the systems 100, 130, 150, and the method 200 and may allow selective transmission of the sensor data 104 and/or the analyzed sensor data 104A to the third party system 116 in exchange of the responder information fees.

Further, the sensor data 104 and/or the analyzed sensor data 104A may facilitate the third party system 116 to provide a more holistic and complete view of events happening with the one or more responders 12 at the hazardous environment 13 (shown in FIG. 1) by displaying the responder information 102 in a presentable manner.

In some embodiments, similar computer-implemented methods may be implemented in the system 130 of FIG. 3 and the system 150 of FIG. 4. For example, the method, with reference to FIG. 3, may include establishing, via the local application 138, the corresponding direct communication links 135 between the computing device 106 and the one or more handheld computing devices 132 and the direct communication link 125 between the computing device 106 and the at least one third party server 118. The method may further include transmitting, via the one or more handheld computing devices 132, the analyzed sensor data 104A to the computing device 106. The method may further include transmitting, via the computing device 106, the analyzed sensor data 104A to the at least one third party server 118.

In another example, with reference to FIG. 4, the method may include establishing, via the corresponding APIs 112 of the one or more handheld computing devices 132, the corresponding direct communication links 137 between the one or more handheld computing devices 132 and the at least one third party server 118. The method may include transmitting, via the one or more handheld computing devices 132, the analyzed sensor data 104A directly to the at least one third party server 118.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below, or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components, or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A computer-implemented method for providing responder information, the computer-implemented method comprising:
   receiving, via a computing device, a sensor data generated by one or more safety devices corresponding to one or more responders;
   analyzing, via the computing device, the sensor data to generate an analyzed sensor data;
   establishing, via an application programming interface (API), a direct communication link between the computing device and at least one server;
   transmitting, via the computing device, the analyzed sensor data to the at least one server;
   transmitting, via the at least one server, the analyzed sensor data to at least one third party server of a third party system; and
   determining, via the at least one third party server, a responder information based on the analyzed sensor data.

2. The method of claim 1, wherein each of the one or more safety devices comprises at least one of an article of PPE and an emergency response tool.

3. The method of claim 1, wherein the sensor data generated by the one or more safety devices is indicative of at least one of environmental conditions of the corresponding one or more responders, physiological conditions of the corresponding one or more responders, location data of the corresponding one or more responders, and one or more parameters of the one or more safety devices.

4. A system for providing responder information comprising:
   one or more safety devices corresponding to one or more responders, wherein the one or more safety devices are configured to generate a sensor data;
   a computing device communicably coupled to the one or more safety devices via a communication channel,
   at least one server;
   an application programming interface (API) for establishing a direct communication link between the computing device and the at least one server; and
   a third party system comprising at least one third party server communicably coupled to the at least one server;
   wherein the computing device is configured to:
      receive the sensor data generated by the one or more safety devices via the communication channel;
      analyze the sensor data to generate an analyzed sensor data; and
      transmit the analyzed sensor data to the at least one server;
   wherein the at least one server is configured to transmit the analyzed sensor data to the at least one third party server, and wherein the at least one third party server is configured to determine a responder information based on the analyzed sensor data.

5. The system of claim 4, wherein each of the one or more safety devices comprises at least one of an article of PPE and an emergency response tool.

6. The system of claim 4, wherein the sensor data generated by the one or more safety devices is indicative of at least one of environmental conditions of the corresponding one or more responders, physiological conditions of the corresponding one or more responders, location data of the corresponding one or more responders, and one or more parameters of the one or more safety devices.

7. The system of claim 4, wherein the communication channel is a Radio communication channel.

8. A computer-implemented method for providing responder information, the computer-implemented method comprising:
   receiving, via a computing device, a sensor data generated by one or more safety devices corresponding to one or more responders;
   analyzing, via the computing device, the sensor data to generate an analyzed sensor data;
   establishing, via an application programming interface (API), a direct communication link between the computing device and at least one server;
   transmitting, via the computing device, the analyzed sensor data to the at least one server;
   receiving, via the at least one server, an information request signal from at least one third party server of a third party system;
   transmitting, via the at least one server, the analyzed sensor data to the at least one third party server upon receiving the information request signal from the at least one third party server of the third party system; and
   determining, via the at least one third party server, a responder information based on the analyzed sensor data.

* * * * *